US008576835B2

(12) United States Patent
Acharya et al.

(10) Patent No.: US 8,576,835 B2
(45) Date of Patent: Nov. 5, 2013

(54) METHOD AND APPARATUS FOR PROVIDING CONTEXTUAL INFORMATION WITH TELEPHONE CALLS

(75) Inventors: Arup Acharya, Nanuet, NY (US); Maria Rene Ebling, White Plains, NY (US); Zon-Yin Shae, South Salem, NY (US); Edith Helen Stern, Yorktown Heights, NY (US); Dinesh Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 12/135,445

(22) Filed: Jun. 9, 2008

(65) Prior Publication Data
US 2008/0240381 A1   Oct. 2, 2008

Related U.S. Application Data

(63) Continuation of application No. 11/031,927, filed on Jan. 8, 2005, now abandoned.

(51) Int. Cl.
*H04L 12/28* (2006.01)

(52) U.S. Cl.
USPC ............................................ 370/352; 370/354

(58) Field of Classification Search
USPC ........ 370/352–356, 260; 379/201.01, 210.01, 379/211.01, 211.02; 455/461, 417, 518; 709/226–230
See application file for complete search history.

(56) References Cited

U.S. PATENT DOCUMENTS

| | | | |
|---|---|---|---|
| 6,104,802 A | | 8/2000 | Perlmutter et al. |
| 6,625,141 B1 * | | 9/2003 | Glitho et al. .................. 370/352 |
| 7,362,698 B2 * | | 4/2008 | Christensen et al. ......... 370/217 |
| 7,372,957 B2 * | | 5/2008 | Strathmeyer et al. .... 379/265.01 |
| 7,400,575 B2 * | | 7/2008 | Christensen et al. ......... 370/217 |

(Continued)

FOREIGN PATENT DOCUMENTS

| | | |
|---|---|---|
| EP | 1024643 A1 | 8/2000 |
| GB | 2290193 A | 12/1995 |
| WO | WO 02/47367 A2 | 6/2002 |
| WO | WO 03/024038 A1 | 3/2003 |

OTHER PUBLICATIONS

International Search Report Mailed Jan. 27, 2006 in related International Application No. PCT/EP2005/055294.

(Continued)

*Primary Examiner* — Hassan Kizou
*Assistant Examiner* — Emmanuel Maglo
(74) *Attorney, Agent, or Firm* — August Law, LLC; George Willinghan

(57) ABSTRACT

The present invention is directed to a method for propagating contextual data in an audio communication by storing the contextual data obtained from a calling party in an extensible mark-up language formatted text document. A telephone call between a first party and a second party is converted to a session initiation protocol based voice over internet protocol communication, and the stored text document is attached to session initiation protocol messages that control the voice over internet protocol communication. The document is attached to the signaling messages by embedding the text document in a session description payload associated with the session initiation protocol message. The attached document is propagated with the audio communication, including when the signaling messages are used to transfer the audio communication from the second party to a third party or to add one or more addition parties to the audio communication.

14 Claims, 4 Drawing Sheets

(56) References Cited

U.S. PATENT DOCUMENTS

| | | | |
|---|---|---|---|
| 7,656,861 B2* | 2/2010 | Jones et al. | 370/352 |
| 7,747,761 B2* | 6/2010 | Wengrovitz | 709/228 |
| 7,783,023 B2* | 8/2010 | Balk et al. | 379/211.01 |
| 8,098,651 B1* | 1/2012 | Ramsayer et al. | 370/352 |
| 2002/0127995 A1* | 9/2002 | Faccinn et al. | 455/406 |
| 2002/0187777 A1* | 12/2002 | Osterhout et al. | 455/417 |
| 2003/0021264 A1 | 1/2003 | Zhakor et al. | |
| 2003/0161448 A1* | 8/2003 | Parolkar et al. | 379/88.17 |
| 2004/0184432 A1* | 9/2004 | Gateva et al. | 370/349 |
| 2004/0240399 A1* | 12/2004 | Corrao et al. | 370/260 |
| 2005/0015709 A1* | 1/2005 | Lavoie et al. | 715/500 |
| 2005/0141691 A1* | 6/2005 | Wengrovitz | 379/211.02 |
| 2006/0080407 A1* | 4/2006 | Rengaraju | 709/219 |
| 2006/0143318 A1* | 6/2006 | Prajapat et al. | 710/8 |
| 2006/0239242 A1* | 10/2006 | Huffschmid | 370/352 |
| 2010/0220715 A1* | 9/2010 | Cherchali et al. | 370/352 |

OTHER PUBLICATIONS

R. Sparks, A. Johnston, D. Petrie "Session Initiation Protocol Call Control-Transfer" Internet Draft Oct. 21, 2004.

\* cited by examiner

METHOD AND APPARATUS FOR PROVIDING CONTEXTUAL INFORMATION WITH TELEPHONE CALLS

CROSS-REFERENCE TO RELATED APPLICATIONS

The present application is a continuation of co-pending U.S. application Ser. No. 11/031,927, filed Jan. 8, 2005. The entire disclosure of that application is incorporated herein by reference.

FIELD OF THE INVENTION

The present invention is directed to the field of computer networks. More specifically, the present invention is directed to computer telephony, in particular Voice-over-Internet-Protocol.

BACKGROUND OF THE INVENTION

Various businesses handle a large volume of phone calls from clients or customers. To facilitate the processing of this large volume of phone calls, many businesses utilize technologies such as call centers. In general, each call center contains the equipment and personnel necessary to manage and to process a large volume of inbound or outbound calls. Inbound call centers receive calls, for example via toll-free numbers, from customers looking to obtain information about the goods or services that a company sells, to purchase those goods or services and to obtain assistance. Therefore, the inbound call centers provide support for incoming sales and for customer service requests. Outbound call centers typically contain a large number of salespeople making calls in an attempt to sell products or services. The same arrangement of equipment in a given call center can be used as either an inbound call center or an outbound call center.

Inbound call centers typically contain an automatic call distributor (ACD) to handle and route incoming calls. For example, the ACD connects calls to a sales representative, a customer service representative or a help desk operator among others. The ACD also facilitates automated routing of incoming calls to prompt the caller to select one or more menu choices and to place calls that cannot be answered immediately into a hold queue until the appropriate next agent becomes available. The hold queue provides the caller with music, advertising or periodic barge-in messages updating the caller on the current queue status. Responses to the menu choices facilitate routing of the call through the call center in the most appropriate way.

When an operator or representative becomes available, the incoming call is answered, and the representative agent assesses the caller's immediate needs and records relevant information about the caller in a computer accessible database. This relevant information includes caller identifying information such as account numbers. Once stored in the computer accessible database, the information can be accessed by any operator or representative within the company that has a computer and access to the database. Therefore, this information can be provided to operators the next time the user calls or can be accessed by operators or agents to whom the call is forwarded.

The saved information is typically made available to operators or customer service representatives on the screens of computers located in the call centers through a mechanism known as "screen pops". In general, a database entry is created for storing the information about each client, and this database entry can be amended. For new incoming telephone calls, the identification of the caller, for example the telephone number associated with the caller, is determined, and this identification is used to populate a representative's computer screen with data that is already known about the customer. For calls that are transferred or forwarded within a given call center, successive operators can access some or all of the stored information by querying the database. However, each operator must have access to the database, and difficulties with database performance, availability, synchronization schemes and access controls affect operator access to the necessary information. In addition, when a call is transferred between administrative domains, e.g. from an initial call center to a distant call center, the problems associated with database access are exacerbated.

Current systems do not address situations where the caller dynamically provides data, for example details of a current problem, or current information to an operator. The screen pop systems only provide information that has been previously acquired and stored in the database. Current telephone communication systems do not provide session specific contextual information across termination points of a telephone call, in particular when those termination points span administrative or application domains. For example, when a telephone call is transferred from a first call center to a second call center, the contextual information is lost. Lost contextual information has to be re-entered or repeated by the caller. Repetitive entry of information is onerous to the customer.

Therefore, a need exists for propagating current and updated session-specific contextual information among various operators or representatives in one or more call centers, eliminating the need for repeated entry by a caller of the same information. The contextual information would be provided without having to access a central database and would be provided concurrent with the transfer of the actual telephone call.

SUMMARY OF THE INVENTION

The present invention is directed to methods and systems that permit a caller or any participant in an audio communication session to provide dynamic, contextual information only once for a given call or session. In accordance with the present invention, caller-specific contextual information is associated with the caller and the telephone call or audio communication session for the duration of the call session. The state information obtained from the caller at or near the initiation of the call is propagated to each termination point to which the call is forwarded. These termination points include customer premises equipment associated with operators located within a single call center or disposed among a plurality of distinct call centers. The termination points also include equipment associated with a third party located outside of the call centers.

A call is initiated by a caller and is terminated at an initial agent or representative, for example an operator within a call center or at an automatic call distributor (ACD). The call is converted to a session initiation protocol (SIP) based voice over internet protocol (VoIP) call, and the initial operator or ACD obtains contextual data or information from the caller. The information received is converted to an extensible markup language (XML) document and attached to the SIP messages that are controlling the call. As the messages controlling the call are forwarded, so is the associated contextual information.

Therefore, the present invention ties the contextual data to the call itself, allowing the call-specific contextual data to be transferred to any domain, including different domains running different applications from the original termination point domain without requiring access to a corporate database. Methods and systems in accordance with the present invention allow on-demand call transfer for customer relationship management (CRM) or other purposes, with appropriate contextual or other information coupled with the call to facilitate a near seamless customer experience. The present invention also enables loose integration of call centers via a decreased requirement for integration of applications and middleware.

DETAILED DESCRIPTION

Figure 1:
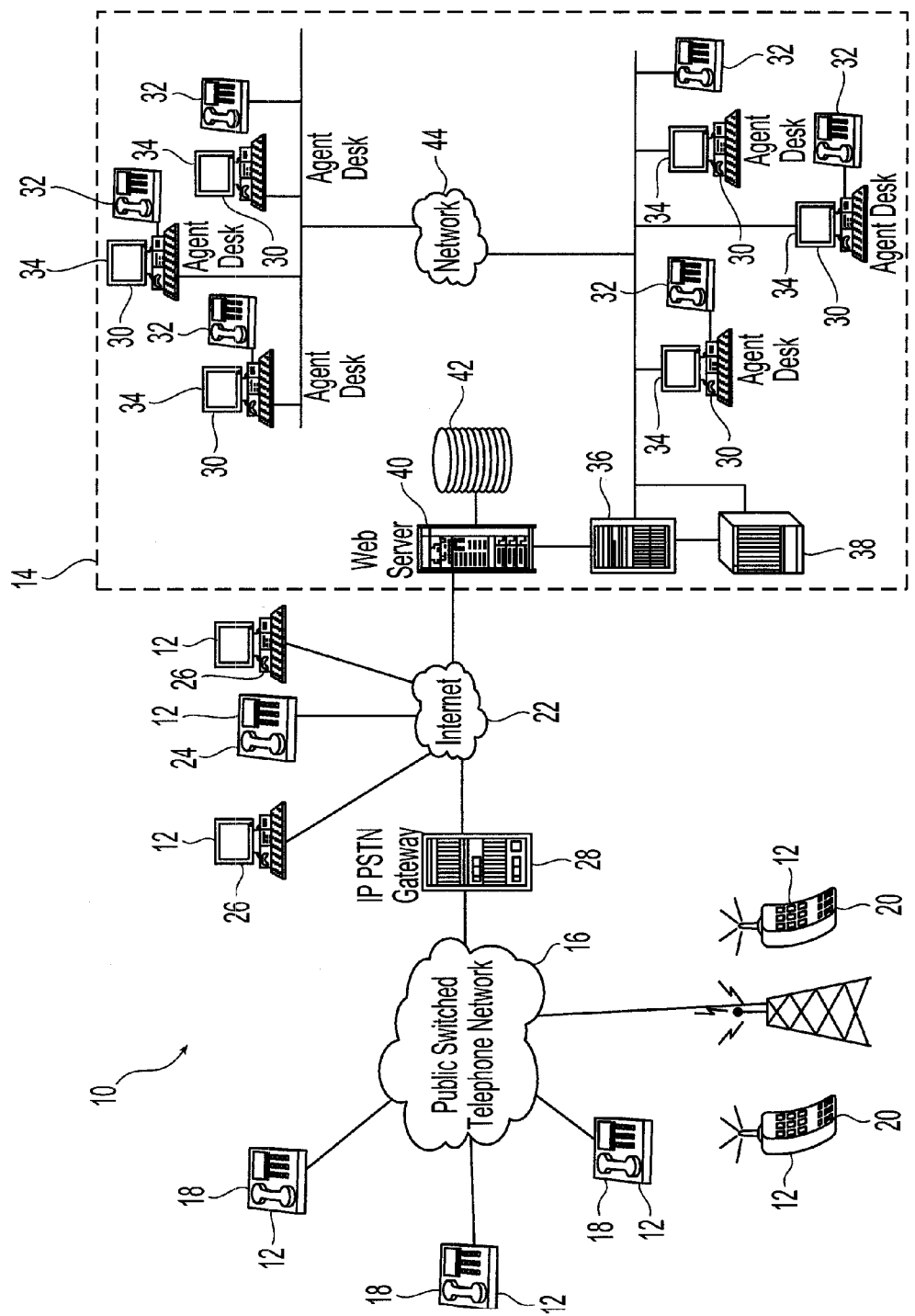
FIG. 1 is a schematic representation of an embodiment of a system for use with the present invention.

Referring initially to FIG. 1, a system 10 for use in accordance with the present invention is illustrated. As illustrated, the system includes one or more callers 12 or customers and a company or call center 14. The callers 12 contact the call center through the public switched telephone network 16 using, for example, conventional wireline phones 18 or cellular phones 20 as the customer premises equipment (CPE). The callers 12 can also contact the call center 14 through the internet 22 using voice over internet protocol (VoIP) enabled phones 24 or multimedia computer systems 26 as the CPE. The system 10 also includes an internet protocol (IP) PSTN gateway 28 as an interface between the PSTN 16 and the internet 22.

The call center 14 includes a plurality of agents, operators or customer service representatives 30. Each customer service representative 30 is provided with equipment to handle both the audio portion of an audio communication session or telephone call and the inputting and display of data related to the audio communication. As illustrated, each agent 30 includes a telephone 32 and a computer 34. Although illustrated as separate equipment, the functions of the telephone 32 and computer 34 can be combined into a single piece of equipment. The agents 30 within the call center 14 can be located at a single geographical location or can be located at two or more distinct physical locations. The location and arrangement of the agents 30 is transparent to the callers 12.

The call center 14 also includes an automatic call distributor (ACD) 36 to handle and route the incoming calls through the call center 14. In one embodiment, the call center 14 also includes a private branch exchange (PBX) 38 through which the ACD 36 lines can be routed to provide general carrier interface support for the call center 14. Although illustrated a two distinct pieces of equipment, a combined ACD/PBX can also be used. Interface with the internet is provided through a web server 40, and one or more databases 42 are provided to store information needed by the agents including, but not limited to, technical support information, customer information, parts list and price lists. The database 42 can also include the computer executable code for running methods in accordance with the present invention. All of the agents 30, the ACD 36, the PBX 38, the web server 40 and the database 42 are in communication through one or more networks 44. Suitable networks 44 include local area networks, e.g. an Ethernet network, a wide area network, secure local and wide are networks, secure wireless networks, enterprise-wide networks, storage area networks, virtual private networks, secure virtual private networks, internet area networks, internet secure networks, personal area networks and combinations thereof. The telephones 32 located at each agent 30 can be in direct communication with the network 44 or can be in communication with the network through the computer 34.

Figure 2:
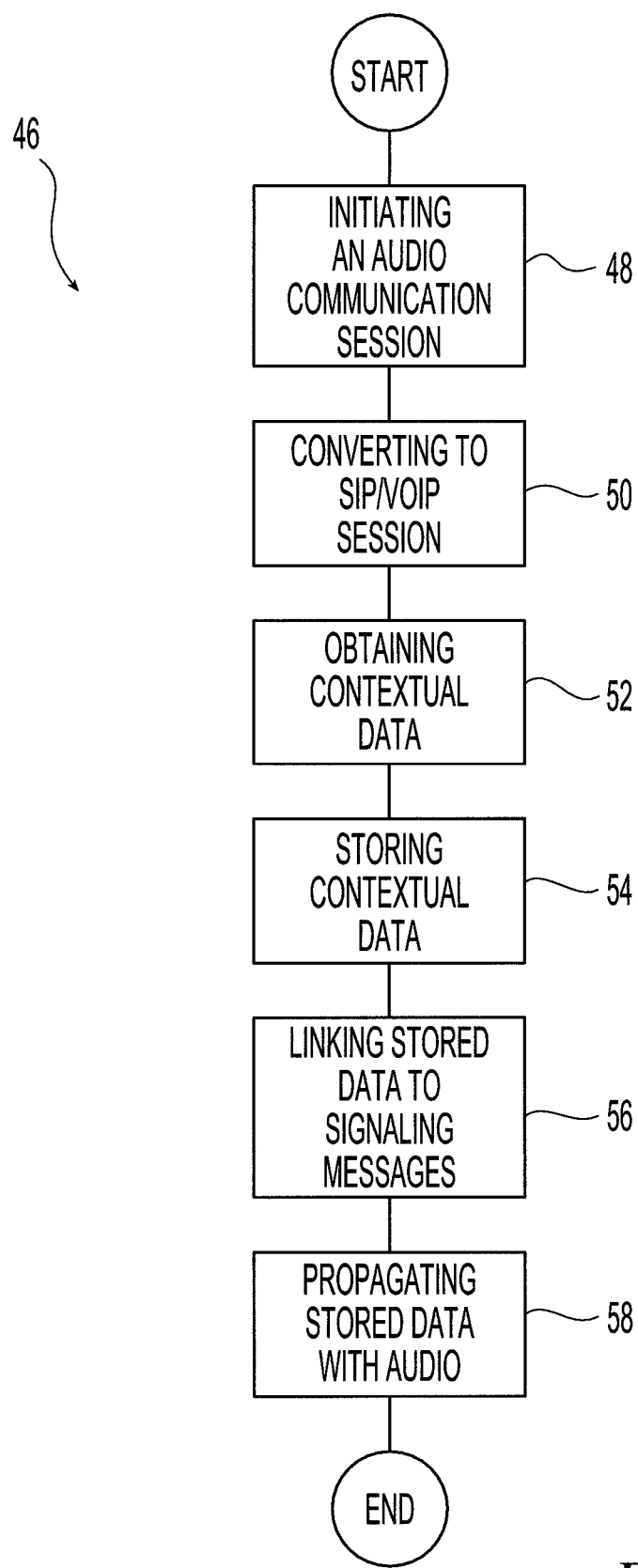
FIG. 2 is a flow chart illustrating an embodiment of a method for propagating contextual data in an audio communication in accordance with the present invention.

Referring to FIG. 2, an embodiment of a method for propagating contextual data in an audio communication 46 in accordance with the present invention is illustrated. An audio communication session is initiated between a first party and a second party 48. Suitable audio communication sessions include any audio communication session between two or more parties utilizing wireline and wireless telephone systems including the Public Switched Telephone Network (PSTN), analogue cellular communication systems, digital cellular communication systems, satellite communication systems, Voice-over-Internet Protocol (VoIP) communication systems (either H323 or SIP based) and combinations thereof. Audio communication sessions also include the audio portion of a mixed media communication, for example a video or web-based conferencing session. In one embodiment, the first party is a caller 12 (FIG. 1), and the second party is a call center 14 (FIG. 1). Alternatively, the first and second parties can both be call centers or can both be individual callers. In order to initiate the audio communication session, either the first party calls the second party, or the second party calls the first party using the customer premises equipment located at the first or second party. In one embodiment, a VoIP telephone call from the first party to the second party is initiated using a VoIP telephone located at the first party or a computer webpage interface. In another embodiment, a telephone call for the first party to the second party is initiated over a public switched telephone network using a wireline or wireless telephone.

Once the session is initiated, the audio communication session is converted to a format that supports the linking of contextual data with audio. In one embodiment, the initiated audio communication session is converted to a VoIP communication session 50. Any suitable protocol for conducting a VoIP session can be used. Preferably, the VoIP communication session is a session initiation protocol (SIP) based VoIP communication session. When the incoming phone call from the first party is made across the PSTN, the PSTN is interfaced with the internet thought the IP/PSTN gateway to facilitate the conversion of the audio communication session to a VoIP communication session. Alternatively, the first party initiates a VoIP telephone call. In this embodiment, the audio communication does not have to be converted to a VoIP communication session; however, the protocol is confirmed to be SIP.

The audio communication session between the first party and the second party has been initiated by the first party for a particular purpose, for example technical support, customer service or sales. In order to facilitate the processing of the service requested by the first party, the second party obtains contextual data from the first party 52. This contextual data is caller specific and preferably audio session specific. The contextual data includes, but is not limited to, account information, pass codes, personal identification numbers, contact information, personal identification information, queries, responses to questions, purchase requests and combinations thereof. Additional contextual information can be retrieved from the database 42. Methods for obtaining the contextual data including prompting the caller to select form menus using the phone key pad or a voice recognition system, using a graphical interface on the phone or a computer disposed at the caller's premises or using an agent to obtain the contextual information verbally from caller and entering the information using a computer located at the agent.

Having obtained the contextual data from the first party, the contextual data is stored 54 by the second party in a format that can be propagated with the audio portion of the communication session and that can be accessed by current and future participants in the audio session. The contextual information can be stored locally at the second party, and a copy can also be forwarded to the first party. In addition, a copy of the contextual information can also be saved in the database 42 for future use or to protect against unexpected interruptions to the audio communication session. In one embodiment, the contextual data is saved as a text document. Any suitable format for a text document that is known and available in the art can be used. Preferably, the contextual information is stored in an extensible mark-up language (XML) formatted document.

The stored text document is linked to the audio communication 56 so that when the audio portion of the audio communication session is delivered, the text document is also delivered. Preferably, the stored data are linked to one or more of the commands or signaling messages that control the audio communication session itself. In one embodiment, the audio communication session is, or has been converted to, a SIP based VoIP, and SIP is the signaling protocol for VoIP. The communication session is controlled by SIP signaling messages including messages for call setup, for example INVITE, call teardown or termination, for example BYE and call transfer, for example REFER. In one embodiment, the messages are sent as user datagram protocol/internet protocol (UDP/IP) packets.

Since each signaling message contains a session description payload (SDP), the stored text document is preferably embedded in the SDP. Once stored and linked to the audio communication session, the stored contextual data can be propagated with the audio communication session 58. Propagation of the audio communication session includes transferring the audio communication from the second party to a third party or adding one or more additional parties to the audio communication, for example initiating a multi-party telephone conference. In one embodiment, the second party is an agent within the call center, and the third party to whom the audio communication session is transferred is another agent within the call center. The third party can be located at the same physical location as the second party or a separate physical location. This separate physical location can be accessible across a local network, the Internet or a PSTN. Since the text document containing the contextual data is delivered to the additional party, for example the third party, concurrent with the signaling commands, the new party does not need to request the same information from the first party and does not need to access a common database to get the necessary contextual information about the first party.

Figure 3:
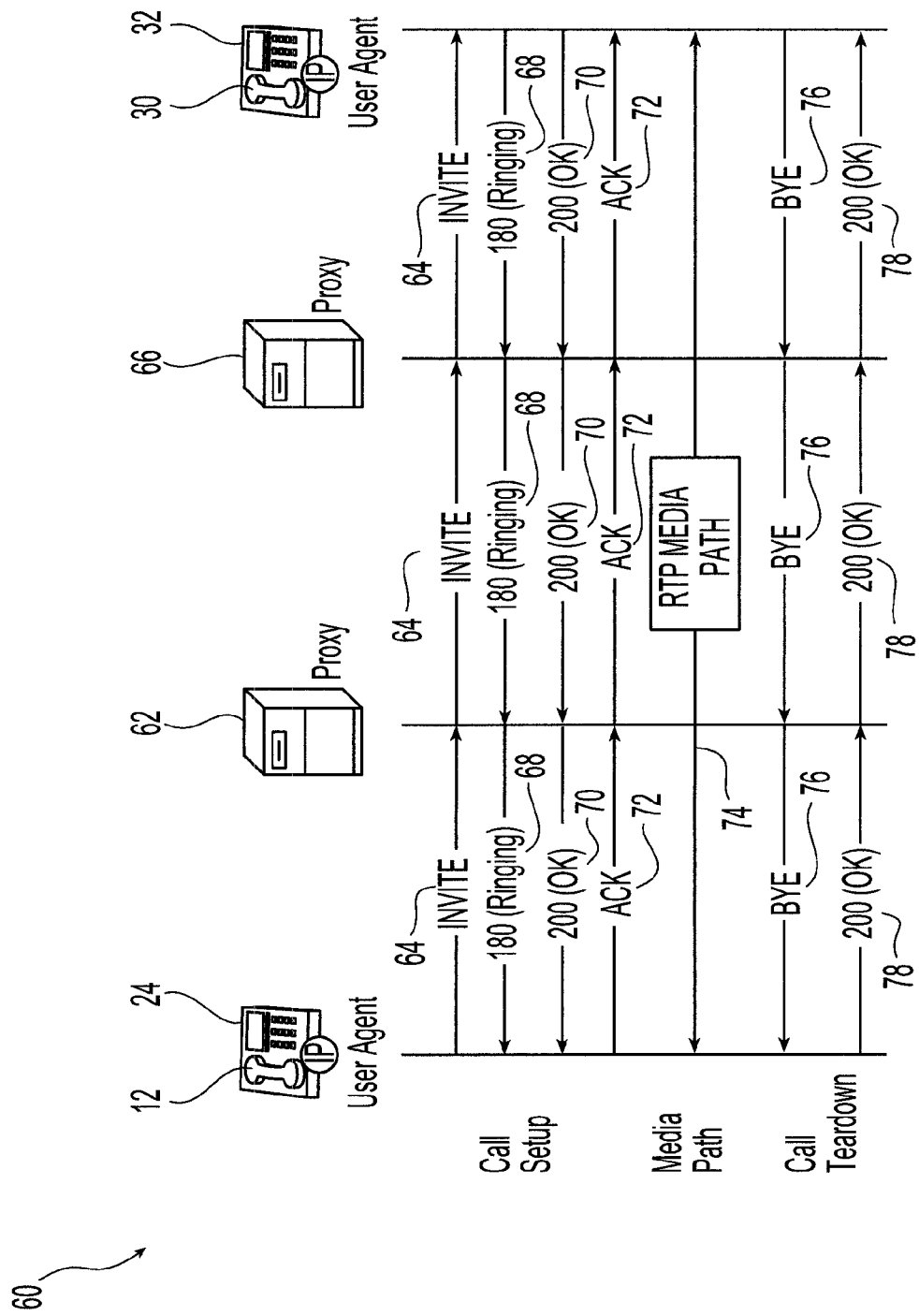
FIG. 3 is a schematic representation of an initiation of a voice over internet communication session for use in the present invention.

An embodiment of a SIP based VoIP call initiation is illustrated in FIG. 3. A caller 12, for example an IP Phone 24 or a laptop running an IP soft phone, registers with a first SIP Proxy 62 using a SIP REGISTER message. The first SIP Proxy 62 is responsible for routing an INVITE message 64 via subsequent proxies 66 to the called party, for example an agent 30 in a call center 14. The caller 12 is provided with a typical "ringing" 68 indicating that the called party's phone is ringing, followed by OK 70 and ACK 72 SIP messages. The INVITE, OK and ACK messages each carry a SDP payload describing the IP address and port numbers of the two endpoints and media characteristics such as codec type. The information in the SDP packet is used to establish a real-time transport protocol (RTP) media path 74 between the caller 12 and the called party 30. Voice packets are sent as RTP/UDP/IP packets across the RTP media path 74 directly between the two endpoints. Termination of the audio communication session is accomplish by one endpoint sending a BYE 76 message to the other endpoint through the SIP Proxies and receiving an OK 78 message in response.

In one embodiment, the present invention uses SIP-based VoIP within the called party's network, for example a customer service organization. After initiating a customer service call, the caller typically provides information, for example name, address, account number and other pertinent information to the called party. Often, the information provided by the caller is used by a first customer service representative to identify a second customer service representative that can provide the desired substantive assistance to the caller. Once the second customer service representative is identified, the call is transferred. By propagating the information provided by the caller, also called the state information, with the transferred call, the caller does not have to provide the same information to the second customer service representative.

Figure 4:
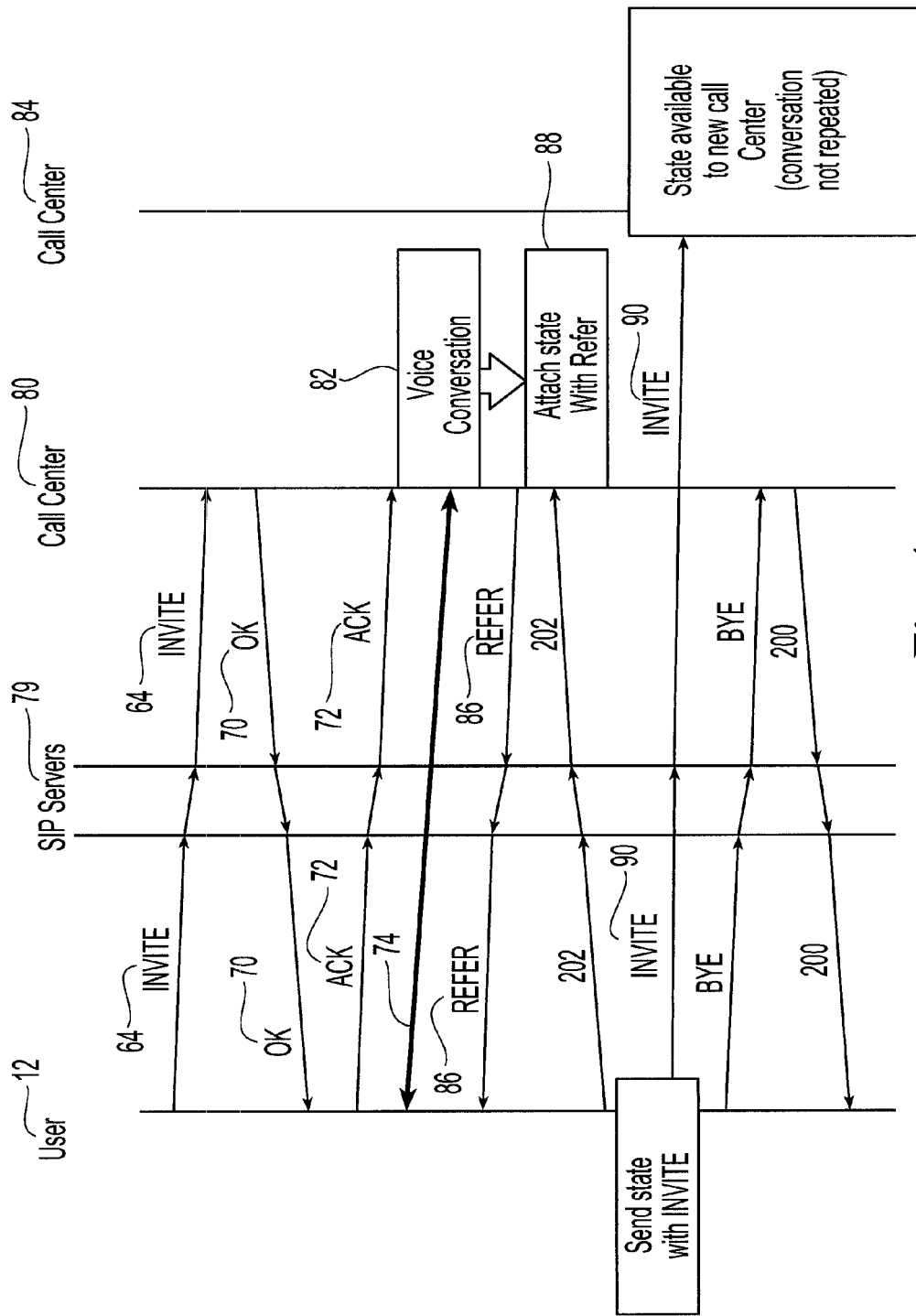
FIG. 4 is a schematic representation of the transfer of a voice over internet communication session for use in the present invention.

Referring to FIG. 4, a caller 12 establishes a SIP-based VoIP communication session through a plurality of SIP proxy servers 79 with a first customer service or call center representative 80 using the INVITE 64, OK 70 and ACK 72 messages as described above. During the voice conversation 82, the first customer service representative 80 obtains the desired state information verbally from the caller and enters the information, which is stored as an XML formatted document. Based upon the content of the state information, the first customer service representative 80 identifies a second customer service representative 84 to assist the caller 12. The first customer service representative 80 initiates a transfer of the call to the second customer service representative 84 by sending a REFER 86 message to the caller 12. The necessary identifying information for he second customer service representative is included in the SDP of the SIP signaling message, and the first customer service representative also attaches or embeds the stored, XML formatted state information in the SDP 88. The REFER message can be handled by a SIP-PSTN gateway if the caller 12 is from a PSTN phone. Acknowledgement 202 that the REFER message was successfully received, understood, and accepted is provided to the first representative 80. The user sends an INVITE 90 message to the second customer service representative 84. This INVITE 90 message contains the XML document that was received with the REFER 86 message. When the call setup for the transferred call is completed using a standard INVITE-OK-ACK exchange, the XML document is available to the second customer service representative 84. The user 12 disconnects from the first representative 80 using a BYE command which is acknowledgement 200 as successfully received, understood, and accepted.

The present invention is also directed to a computer readable medium containing a computer executable code that when read by a computer causes the computer to perform a method for propagating contextual data in an audio communication in accordance with the present invention and to the computer executable code itself. The computer executable code can be stored on any suitable storage medium or database, including databases in communication with and accessible to the caller or call recipient, and can be executed on any suitable hardware platform as are known and available in the art.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for propagating contextual data in an audio communication, the method comprising:
   initiating an audio communication between a first party and a second party, the second party associated with a company and the first party associated with a customer of the company;
   obtaining contextual data from the first party, the contextual data descriptive of and specific to the customer;
   storing the contextual data in a text document;
   linking the text document to the audio communication by embedding the text document in a session description payload contained in all signaling messages controlling the audio communication, the signaling messages comprising INVITE, OK, REFER and ACK signaling messages and the session description payload comprising information to establish a real-time transport protocol media path between the first party and the second party, the information to establish the real-time transport protocol media path separate from the contextual data; and
   propagating the text document with the audio communication.

2. The method of claim 1, wherein the step of initiating an audio communication comprises initiating a voice over internet protocol telephone call from the first party or initiating a telephone call across a public switched telephone network from the first party.

3. The method of claim 1, further comprising converting the audio communication to a session initiation protocol based voice over internet protocol communication.

4. The method of claim 1, wherein the step of obtaining contextual data comprises obtaining account information, pass codes, personal identification numbers, contact information, personal identification information, queries, query responses, purchase requests or combinations thereof.

5. The method of claim 1, wherein the step of storing the contextual data comprises storing the contextual data in an extensible mark-up language formatted document.

6. The method of claim 1, wherein the step of propagating the text document with the audio communication comprises transferring the audio communication from the second party to a third party or adding one or more additional parties to the audio communication.

7. A method for propagating contextual data in an audio communication, the method comprising:
   converting an audio communication between a first party and a second party to a session initiation protocol based voice over internet protocol communication, the second party associated with a company and the first party associated with a customer of the company;
   obtaining contextual data from the first party, the contextual data descriptive of and specific to the customer;
   storing the contextual data in an extensible mark-up language formatted text document;
   attaching the text document to the session initiation protocol signaling messages that control the voice over internet protocol communication by embedding the text document in a session description payload contained in all signaling messages controlling the audio communication, the signaling messages comprising INVITE and REFER signaling messages and the session description payload comprising information to establish a real-time transport protocol media path between the first party and the second party, the information to establish the real-time transport protocol media path separate from the contextual data; and
   propagating the text document with the audio communication.

8. The method of claim 7, wherein the step of propagating the text document with the audio communication comprises transferring the audio communication from the second party to a third party or adding one or more additional parties to the audio communication.

9. A non-transitory computer readable medium containing a computer executable code that when read by a computer causes the computer to perform a method for propagating contextual data in an audio communication, the method comprising:
   initiating an audio communication between a first party and a second party, the second party associated with a company and the first party associated with a customer of the company;
   obtaining contextual data from the first party, the contextual data descriptive of and specific to the customer;
   storing the contextual data in a text document;
   linking the text document to the audio communication by embedding the text document in a session description payload contained in all signaling messages controlling the audio communication, the signaling messages comprising INVITE, OK, REFER and ACK signaling messages and the session description payload comprising information to establish a real-time transport protocol media path between the first party and the second party, the information to establish the real-time transport protocol media path separate from the contextual data; and
   propagating the text document with the audio communication.

10. The non-transitory computer readable medium of claim 9, wherein the step of initiating an audio communication comprises initiating a voice over internet protocol telephone call from the first party or initiating a telephone call across a public switched telephone network from the first party.

11. The non-transitory computer readable medium of claim 9, further comprising converting the audio communication to a session initiation protocol based voice over internet protocol communication.

12. The non-transitory computer readable medium of claim 9, wherein the step of obtaining contextual data comprises obtaining account information, pass codes, personal identification numbers, contact information, personal identification information, queries, responses to questions, purchase requests or combinations thereof.

13. The non-transitory computer readable medium of claim 9, wherein the step of saving the contextual data comprises saving the contextual data in an extensible mark-up language formatted document.

14. The non-transitory computer readable medium of claim 9, wherein the step of propagating the text document with the audio communication comprises transferring the audio communication from the second party to a third party or adding one or more additional parties to the audio communication.

* * * * *